United States Patent
Yamasaki

(10) Patent No.: US 9,071,826 B2
(45) Date of Patent: Jun. 30, 2015

(54) VIDEO ENCODER AND DECODER APPARATUS DECIDING ERROR IN TRANSFORM COEFFICIENTS BETWEEN AN ORIGINAL IMAGE AND A PREDICTIVE IMAGE

(71) Applicant: Oki Electric Industry Co., Ltd., Tokyo (JP)

(72) Inventor: Takahiro Yamasaki, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 315 days.

(21) Appl. No.: 13/725,966

(22) Filed: Dec. 21, 2012

(65) Prior Publication Data

US 2013/0177073 A1 Jul. 11, 2013

Related U.S. Application Data

(62) Division of application No. 12/656,812, filed on Feb. 19, 2010, now Pat. No. 8,363,733.

(30) Foreign Application Priority Data

Mar. 9, 2009 (JP) .................................. 2009-055023

(51) Int. Cl.
*H04N 7/12* (2006.01)
*H04N 19/89* (2014.01)
*H04N 19/30* (2014.01)

(52) U.S. Cl.
CPC ......... *H04N 19/00933* (2013.01); *H04N 19/30* (2014.11); *H04N 19/89* (2014.11); *H04N 19/395* (2014.11)

(58) Field of Classification Search
CPC .................................................. H04N 19/00933
USPC ......................................................... 375/240.12
See application file for complete search history.

(56) References Cited

U.S. PATENT DOCUMENTS 7,502,415 B2  3/2009  Lin et al.

OTHER PUBLICATIONS

Anne Aaron et al., Transform-domain Wyner-Ziv Codec for Video, Proceedings of SPIE Visual Communications and Image Processing, San Jose, CA, 2004.
Catarina Brites et al., "Encoder Rate Control for Transform Domain Wyner-Ziv Video Coding", ICIP 2007.

(Continued)

*Primary Examiner* — Richard Torrente
(74) *Attorney, Agent, or Firm* — Rabin & Berdo, P.C.

(57) ABSTRACT

A video encoder apparatus using a distributed video coding (DVC) includes a Wyner-Ziv frame encoder for forming a predictive image of a Wyner-Ziv frame on the basis of coded key frames, and determining, according to the fallibility of the transform coefficients of the predictive image with respect to the transform coefficients of an original image based on the Wyner-Ziv frame, the amount of error correction codes to be transmitted so as to transmit the error correction codes corresponding to the determined amount. When no errors are found between the transform coefficients of the original image of the Wyner-Ziv frame and the predictive image, information indicating that no errors are found is sent out instead of the error correction codes for the Wyner-Ziv frame in question.

7 Claims, 8 Drawing Sheets

(56) References Cited

OTHER PUBLICATIONS

Joao Ascenso et al., "Improving Frame Interpolation With Spatial Motion Smoothing for Pixel Domain Distributed Video Coding", 5th EURASIP Conference on Speech and Image Processing, Multimedia Communications and Services, Jul. 2005.

Marleen Morbee, Josep Prades-Nebot, Antoni Roca, Aleksandra Pizurica, and Wilfried Philips, "Improved Pixel-Based Rate Allocation for Pixel-Domain Distributed Video Coders Without Feedback Channel," ICIVS 2007.

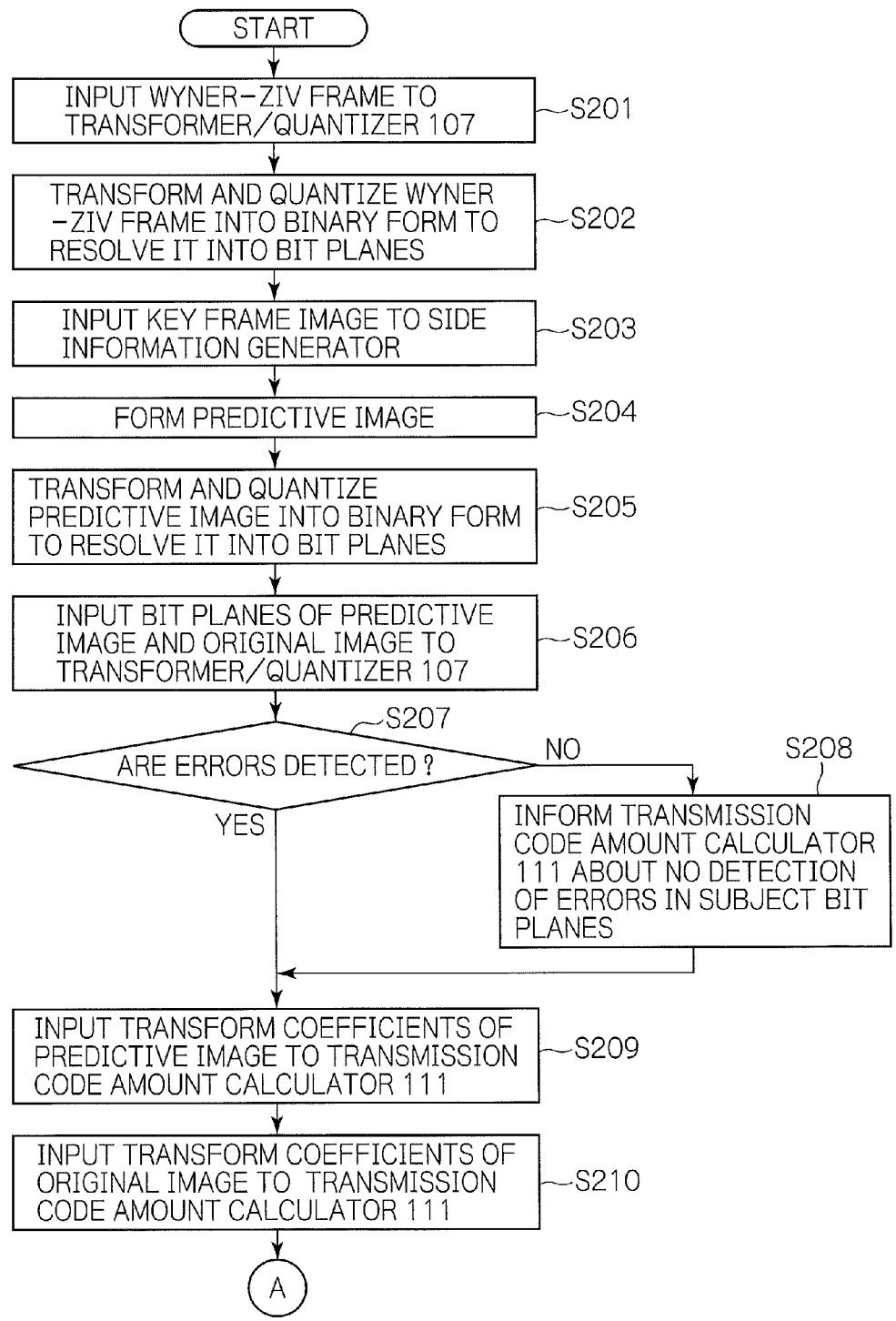

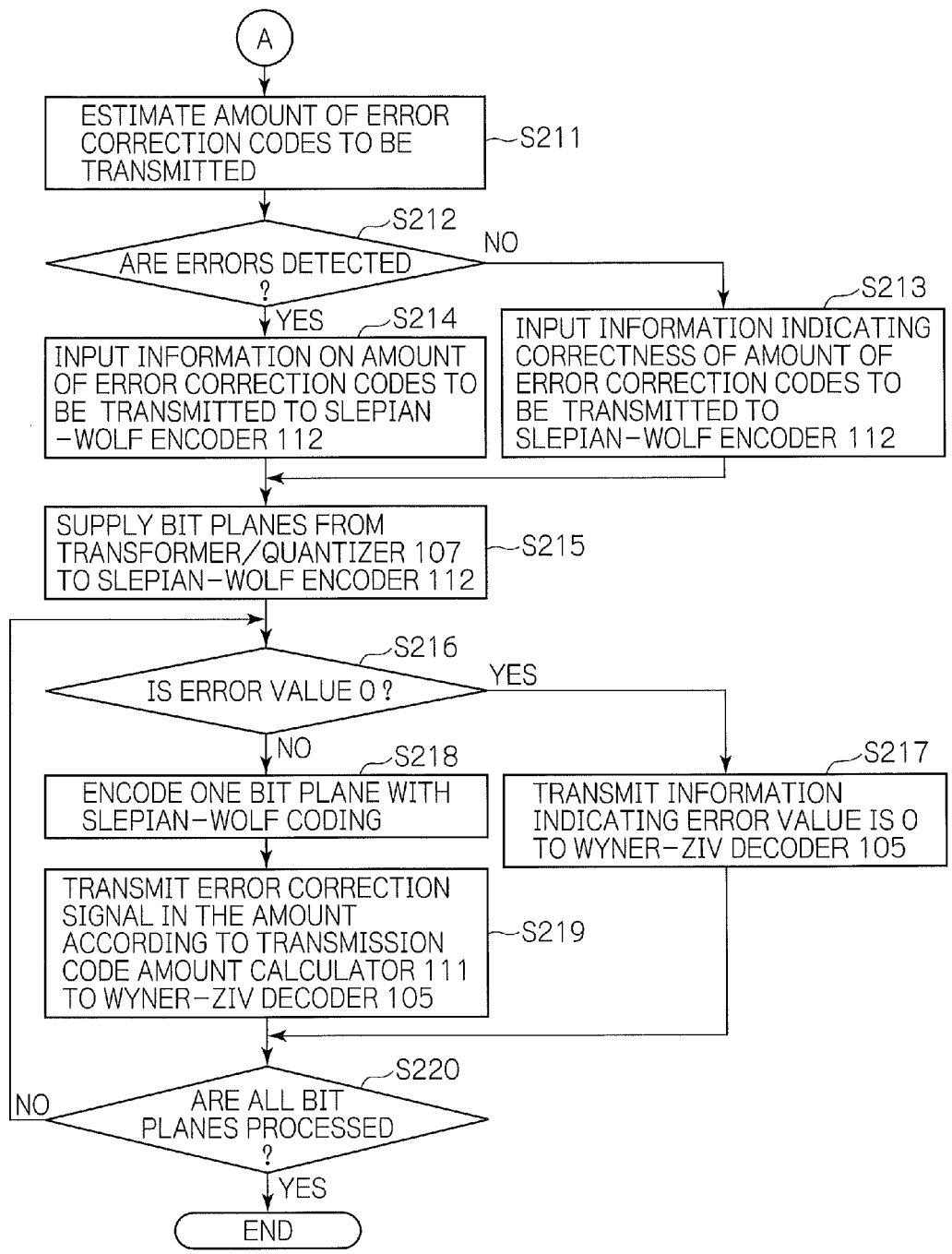

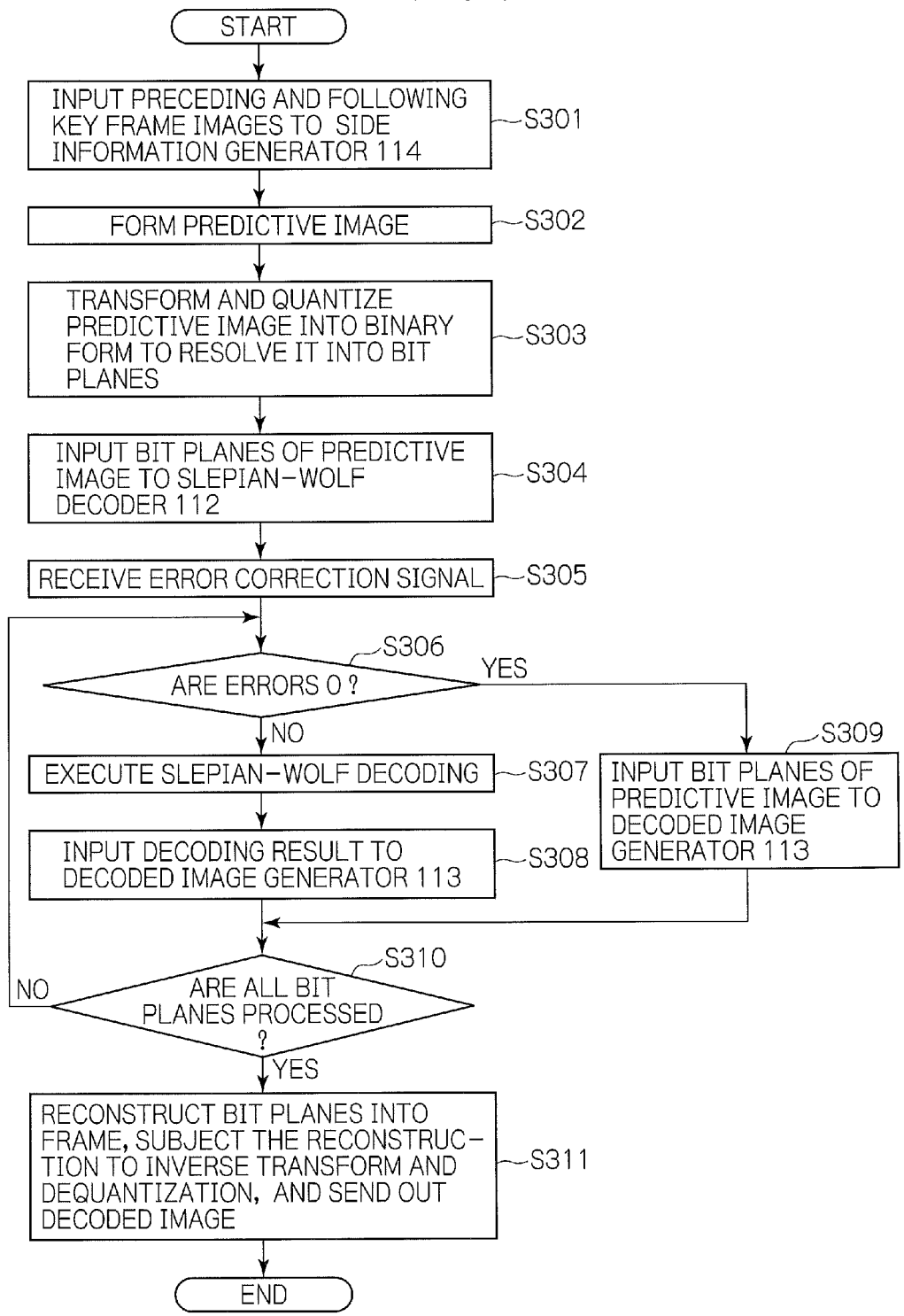

AMBIGUITY IN xn IS SMALL
(PROBABILITY OF 0 IS HIGH)

AMBIGUITY IN xn IS LARGE

AMBIGUITY IN xn IS LARGE
EVEN WHEN NO ERRORS EXIST

VIDEO ENCODER AND DECODER APPARATUS DECIDING ERROR IN TRANSFORM COEFFICIENTS BETWEEN AN ORIGINAL IMAGE AND A PREDICTIVE IMAGE

This application is a divisional of co-pending application Ser. No. 12/656,812 filed on Feb. 19, 2010, the disclosure of which is incorporated herein by reference in its entirety.

BACKGROUND OF THE INVENTION

1. Field of the Invention

The present invention relates to a video encoder apparatus and a video decoder apparatus, and more particularly to such apparatus for use in video encoding and decoding by employing a distributed video coding (DVC).

2. Description of the Background Art

In recent years, a relatively new coding scheme called distributed video coding has come to attention. Such a scheme is taught by Anne Aaron, et al., "Transform-domain Wyner-Ziv Codec for Video", Proceedings of SPIE Visual Communications and Image Processing, San Jose, Calif., 2004. In the DVC solution, an encoder processes original image data to be encoded by Slepian-Wolf encoding to thereby encode the image data, and then on a decoder side a predictive image of the original image is formed and is used in Slepian-Wolf decoding together with the encoded data to thereby restore the original image data.

On the encoder side, an original image to be encoded, in the form of Wyner-Ziv frames, is transformed into a transform coefficient domain, i.e. subjected to a discrete cosine transform (DCT). The transformed data are then quantized for each band by a $2^{Mk}$ level quantizer into binary values $q_k$, which will form information, for example, on a frame of image, i.e. an extract bit plane. The information is in turn subjected to a Slepian-Wolf encoding by a turbo encoder. The resultant data contain bits, which will be temporarily stored in a buffer, whereas the remaining bits will be discarded. This procedure is not explicitly illustrated in Aaron, et al.

On the decoder side, a predictive image is formed by interpolation/extrapolation, and the DCT is performed on the predictive image to thereby transform the image into a transform coefficient domain. The transforming results, namely, the obtained coefficients are delivered as side information for each band to a Slepian-Wolf decoder, i.e. turbo decoder. The Slepian-Wolf decoder in turn requests the encoder to transmit some of the parity bits temporarily stored, and then uses the supplied parity bits as well as the side information to perform the Slepian-Wolf decoding. If the decoding does not work adequately, the Slepian-Wolf decoder requests the encoder again to additionally retransmit some of the parity bits, and then executes the Slepian-Wolf decoding by means of the resupplied parity bits and the side information. This procedure is carried on until the decoding is sufficiently performed. The decoded values obtained by the Slepian-Wolf decoding and the side information are used to reconstruct transform coefficients, and then an inverse transform, or inverse DCT, is carried out on the coefficients to thereby obtain a decoded image.

In the common DVC solution as typically presented by Anne Aaron, et al., in order to perform the Wyner-Ziv frame coding or decoding, the Wyner-Ziv frame encoder transmits some of the error correction codes to the Wyner-ziv frame decoder. Upon receipt of the error correction codes sent from the Wyner-Ziv frame encoder, the Wyner-Ziv frame decoder executes the error correction. If the amount of the received error correction codes is not sufficient for the error correction, the Wyner-Ziv frame decoder requests the Wyner-Ziv frame encoder again to retransmit additional error correction codes. The Wyner-Ziv frame encoder in turn retransmits the error correction codes, the procedure being repeated until the Wyner-Ziv frame decoder can adequately perform the error correction. Such DVC technique involves the feedback of requesting a retransmission of error correction codes, resulting in a delay in the coding process. Furthermore, the encoder and the decoder cannot separately operate from each other.

In order to dispense with such a retransmission request procedure, Catarina Brites, et al., "Encoder Rate Control for Transform Domain Wyner-Ziv Video Coding", ICIP 2007, discloses a solution in which a Wyner-Ziv frame encoder calculates the amount of error correction codes required for an error correction. More specifically, the Wyner-Ziv frame encoder forms a predictive image to which a predictive image that would be formed by the Wyner-Ziv frame decoder side is predicted, and estimates the fallibility of the predictive image. On the decoder side, the amount of the error correction codes required for the error correction to be carried out is calculated. It can therefore achieve a solution which does not require feedback.

The amount of error correction codes to be transmitted, i.e. transmission code amount, is determined by thinning out the error correction codes encoded by the Slepian-Wolf coding. In this solution, a plurality of thinning patterns is prepared, from which a specific thinning pattern suitable for obtaining the code amount required for error correction is selected to thereby determine the code amount to be transmitted. Taking as an example a series of thinning patterns in which the minimum rate for thinning out the error correction codes is of 1/48, 48 thinning patterns are determined, namely, the patterns thinning out error correction codes at the rate of 1/48, 2/48, ... 48/48 are provided, from which one thinning pattern to be transmitted will be selected. For instance, if the amount of error correction codes to be transmitted is determined to be 0.04 bits, then a thinning pattern for thinning out the correction codes to 2/48 will be selected because the use of this pattern is for transmitting 2/48 bits of information content to the Wyner-Ziv decoder. In this case, the Slepian-Wolf encoder thins out the error correction codes to 2/48, and then supplies information on the thinning pattern 2/48 together with a thinned error correction signal to the Wyner-Ziv frame decoder. Upon receipt of the information on the thinning pattern, the Wyner-Ziv frame decoder assumes the received error correction signal as a transmitted thinning pattern to thereby perform the Slepian-Wolf decoding.

With regard to the formation of a predictive image, a method of motion estimation and compensation is disclosed by, for example, Joao Ascenso, et al., "Improving Frame Interpolation With Spatial Motion Smoothing for Pixel Domain Distributed Video Coding", 5th EURASIP Conference on Speech and Image Processing, Multimedia communications and Services, July 2005.

The method for estimating transmission code amount by Catarina Brites, et al., is based upon the assumption that the distribution of a difference in the transform coefficients between a predictive image and an original image conforms to a Laplace distribution, which will be used to determine the fallibility of the transform coefficients of the predictive image. In the method, therefore, the values of transform coefficient of a predictive image may sometimes cause a large amount of error correction codes to be transmitted to be calculated even when no errors exist between the predictive image and the original image.

The conventional method for estimating the amount of transmission error correction codes will be described with reference to FIGS. 6 and 7A to 7C. FIG. 6 schematically illustrates how to calculate a conditional probability pn, and FIGS. 7A, 7B and 7C are graphs plotting the probability pn for the purpose of describing the drawbacks in the conventional method.

The transform coefficients yn at a dot n of a predictive image correspond to the transform coefficients xn of an original image, which have a higher, or more significant, bit $j-1$, which is assumed as identified, where j is a natural number. Then, a determination will be made on a conditional probability pn at which the coefficient of the j-th bit of the transform coefficients xn is equal to unity.

As shown in FIG. 6, when the Laplace distribution centering on the transform coefficients of the predictive image is used, the probability pn can be derived from the following expression:

$$pn=(\text{area of range where } j\text{-th bit is 1})/(\text{sum of areas of ranges where } j\text{-th bit is 0 or 1})$$

On the basis of the probability pn, a conditional entropy is determined. Consequently, the ambiguity of the higher bit j at the time the transform coefficients yn of the predictive image is obtained can be determined. It represents the degree of ambiguity in estimating the j-th bit of the original image based on the transform coefficients of the predictive image, which can be regarded as the fallibility of the predictive image.

The obtained conditional entropy is averaged across the unit of processing, such as the unit of the length of the bit planes or the entire frame in the case of Catarina Brites, et al. On the basis of the average, the fallibility or ambiguity of the transform coefficients of the predictive image across the unit of processing is estimated to calculate the amount of error correction codes to be transmitted. In this calculation, if the value pn is close to 0 or 1, that is, bits 0 or 1 appear biasedly, the lower value is taken as shown in FIG. 7A. On the contrary, if the value pn is closer to 0.5, that is, bits 0 and 1 appear more evenly, the ambiguity increases, so that the higher value is taken as shown in FIG. 7B.

The value pn is defined according to the transform coefficients of a predictive image. When the value pn is closer to the value in which the transform coefficient of the predictive image quantized and digitized changes from 1 to 0 and vice versa, the higher value is taken regardless of whether or not errors exist in the coefficients between the predictive image and the original image, as shown in FIG. 7C.

As described above, values of the transform coefficient of a predictive image may sometimes cause a large amount of error correction codes to be transmitted to be calculated even when no errors exist between a predictive image and an original image.

SUMMARY OF THE INVENTION

It is an object of the present invention to provide a video encoder apparatus and a video decoder apparatus in which the processing load on error correction can be reduced, when no errors are present between a predictive image and an original image, with the coding efficiency improved.

In accordance with the present invention, a vide encoder apparatus, which uses distributed video coding (DVC) to encode an input sequence including a key frame and a non-key frame with respective encoding schemes different from each other to and transmit at least partially an error correction code for an encoded non-key frame to a decoder apparatus, comprises a key frame encoder for encoding the key frame and transmitting the encoded key frame to the decoder apparatus; and a non-key frame encoder for forming a predictive image of the non-key frame on the basis of the encoded key frame, and determining, based on the fallibility of a transform coefficient of the predictive image with respect to a transform coefficient of an original image of the inputted non-key frame, the amount of error correction codes to be transmitted to transmit the error correction codes corresponding to the determined amount. The non-key frame encoder transmits, when no error is detected between the transform coefficients of the original image and the predictive image, information indicating no error is detected, instead of the error correction codes for the non-key frame.

Also in accordance with the present invention, a video decoder apparatus using DVC, wherein an encoded key frame and at least partially an error correction code of an encoded non-key frame are acquired, and a decoded key frame is used to form a predictive image of the non-key frame to perform an error correction on the predictive image with the error correction code, comprises a non-key frame decoder operative in response to information indicating that no error is detected being acquired instead of the error correction code for the non-key frame for outputting the predictive image as a decoded image of the key frame.

In accordance with the present invention, a video decoder apparatus using DVC, wherein an encoded key frame and at least partially an error correction code are acquired from an encoder apparatus, the error correction code being in the amount corresponding to the fallibility of a transform coefficient of a predictive image with respect to a transform coefficient of an original image of a non-key frame, and a decoded key frame is used to form a predictive image of the non-key frame to perform an error correction on the predictive image with the error correction code, comprises a non-key frame decoder for forming the predictive image of the non-key frame in a manner in which the predictive image is formed on the encoder apparatus, the non-key frame decoder being operative in response to information, which indicates that no error is detected and is acquired instead of the error correction code for the non-key frame, to output the predictive image thus formed as a decoded image of the key frame.

Further in accordance with the present invention, a video transmission system comprises the above-described video encoder apparatus and video decoder apparatus.

According to the video encoder apparatus and the video decoder apparatus of the present invention, when no errors are detected in the transform coefficients between an original image based on a non-key frame and a predictive image, information on no detection of errors is transmitted instead of error correction codes for the non-key frame in question. Consequently, in the case where no errors are detected between the predictive image and the original image, the processing load on the error correction can be diminished, and thus the efficiency in coding can be improved.

In the context, the word "video" may sometimes be comprehended as motion video as with a video encoder or decoder in the specification.

BRIEF DESCRIPTION OF THE DRAWINGS

The objects and features of the present invention will become more apparent from consideration of the following detailed description taken in conjunction with the accompanying drawings in which:

FIGS. 2A and 2B are flowcharts useful for understanding an operation of the Wyner-Ziv frame encoder according to the preferred embodiment shown in FIG. 1;

FIG. 3 is a flow chart useful for understanding an operation of the Wyner-Ziv frame decoder according to the preferred embodiment;

DESCRIPTION OF THE PREFERRED EMBODIMENTS

Figure 1:
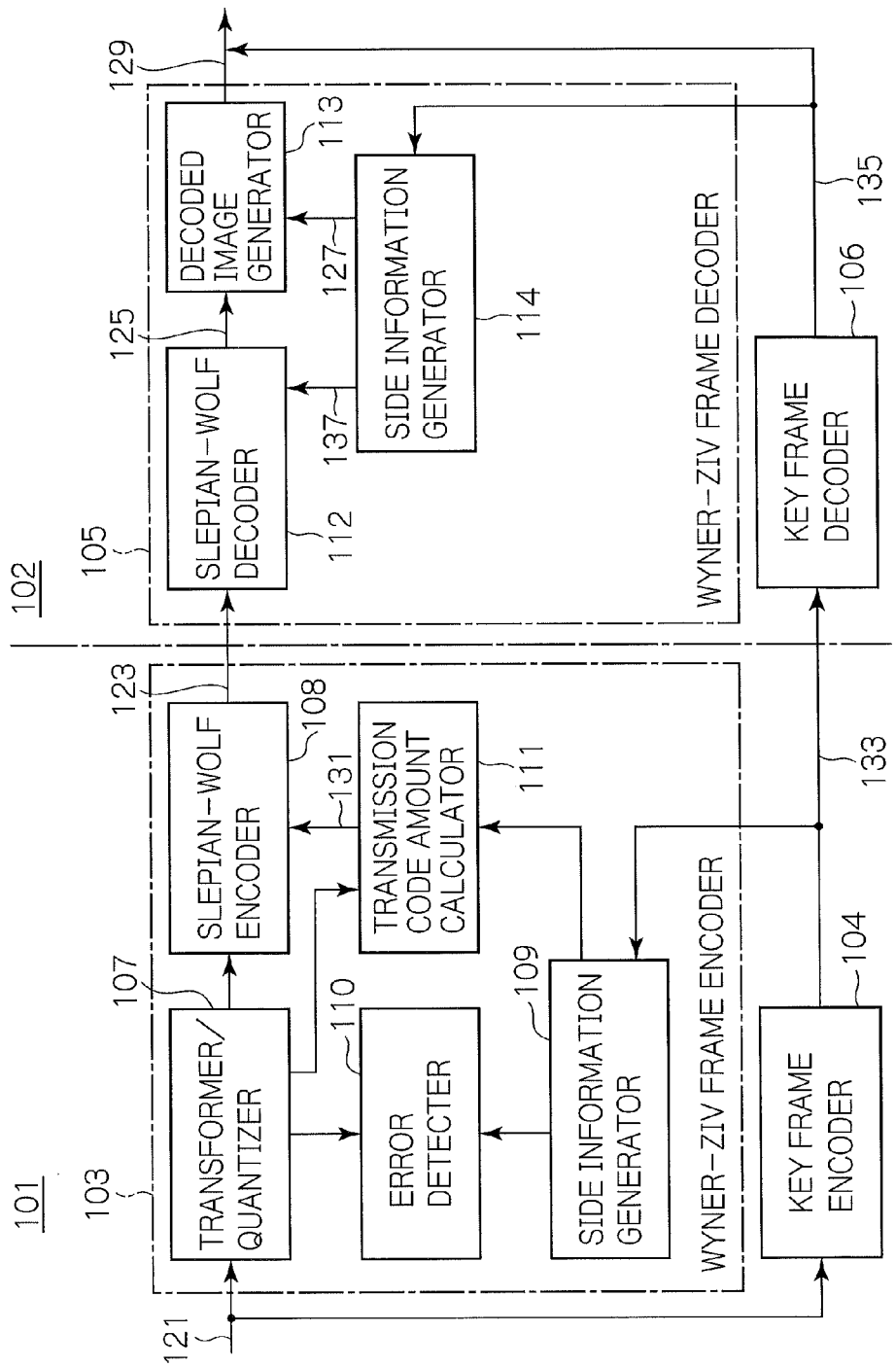
FIG. 1 is a schematic block diagram showing a video encoder apparatus and a video decoder apparatus according to a preferred embodiment of the present invention.

With reference to FIG. 1, a preferred embodiment of a video transmission system including a video encoder apparatus 101 and a video decoder apparatus 102 in accordance with the present invention will be described in detail. Generally, the video encoder apparatus 101 comprises a Wyner-Ziv frame encoder 103 and a key frame encoder 104, and the video decoder apparatus 102 comprises a Wyner-Ziv frame decoder 105 and a key frame decoder 106.

More in detail, the Wyner-Ziv frame encoder 103, a non-key frame encoder, comprises a transformer/quantizer 107, a Slepian-Wolf encoder 108, a side information generator 109, an error detector 110 and a transmission code amount calculator 111, which are interconnected as shown. The Wyner-Ziv frame decoder 105, also a non-key frame decoder, comprises a Slepian-Wolf decoder 112, a decoded image generator 113 and a side information generator 114, which are interconnected as depicted.

The key frame encoder 104 is adapted to extract key frames from an input sequence 121 to encode the obtained frames by a conventional encoding scheme, such as MPEG (Moving Picture Experts Group) or JPEG (Joint Photographic Experts Group) encoding. In the context, a key frame is a frame of image or picture that defines the starting and ending points of any smooth transition. The key frame encoder 104 transmits the encoded frame data to the video decoder apparatus 102. In the application, information, signals or data are designated with reference numerals of connections on which they are conveyed.

The transformer/quantizer 107 is configured to extract Wyner-Ziv frames from the input sequence 121 to transform and quantize the extracted frames to resolve each frame into bit planes.

The side information generator 109 is a sort of predictive image generator, and is connected to be fed with a key frame animation positioned adjacently before or behind the Wyner-Ziv frame, or key frame animations immediately preceding and following the Wyner-Ziv frames, in the sequence of successive frames. The side information generator 109 forms the predictive image of the Wyner-Ziv frame, transforms and quantizes it to resolve it into bit planes.

The error detector 110 is configured to obtain from the transformer/quantizer 107 bit planes of the original image of the Wyner-Ziv frame. In addition, the error detector 110 derives from the side information generator 109 the bit planes of the predictive image corresponding to the original image of the Wyner-Ziv frame. The error detector 110 is also configured to compare the bit planes of the original image of the Wyner-Ziv frame with those of the predictive image to thereby detect differences, namely errors, therebetween.

The transmission code amount calculator 111 is connected to be fed with transform coefficients of the predictive image formed by the side information generator 109 and transform coefficients of the Wyner-Ziv frame derived from the transformer/quantizer 107. The transmission code amount calculator 111 is adapted to estimate parameters of the distribution of estimation errors in the transform coefficients of the predictive image, and use the estimated distribution of estimation errors and the transform coefficients of the original image to estimate the amount of error correction codes of each bit plane.

The Slepian-Wolf encoder 108 is a transmitter encoder adapted to process the bit planes delivered from the transformer/quantizer 107. The Slepian-Wolf encoder 108 particularly performs the Slepian-Wolf encoding, such as turbo coding or low-density parity-check (LDPC) coding, on bit planes in which errors are detected by the error detector 110, and then transmits the amount of error correction codes calculated by the transmission code amount calculator 111 to the Wyner-Ziv frame decoder 105. In regard to the bit planes in which no errors are detected by the error detector 110, the Slepian-Wolf encoder 108 supplies the Wyner-Ziv frame decoder 105 with the information 123 indicating that no errors are detected.

The key frame decoder 106 is adapted to receive the encoded data about the key frames encoded by the key frame encoder 104. The key frame decoder 106 then decodes the received encoded data to thereby derive decoded images, which will be output on a connection 135.

The side information generator 114 is a predictive image generator adapted to be supplied from the key frame decoder 106 with the decoded images of a key frame positioned before or behind, or key frames positioned before and behind the Wyner-Ziv frames as depicted with a connection 135. Furthermore, the side information generator 114 forms predictive images of Wyner-Ziv frames on the basis of the obtained decoded images of the key frames by means of the motion estimation and compensation or the equivalent, and then transforms and quantizes the formed images to thereby resolve them into bit planes.

The Slepian-Wolf decoder 112 is a kind of decoder adapted to perform decoding in such a manner that, when the bit planes are determined on the basis of information 123 on a thinning pattern fed from the Wyner-ziv frame encoder 103 that error values in the bit planes are not zero, the obtained error correction codes are used to perform the Slepian-Wolf decoding on the bit planes 137 generated by the side information generator 114 whereas, if the error values are zero, then the Slepian-Wolf decoder 112 defines the supplied bit planes as decoding results.

The decoded image generator 113 is configured to reference the decoding results 125 of the bit planes from the Slepian-Wolf decoder 112 and the information 127 on the predictive images formed by the side information generator 114 to reconstruct information forming a frame, and then carry out inverse transform and dequantization (inverse quantization) on the reconstructed frame to thereby obtain decoded images 129.

The components in the video encoder apparatus 101 and the video decoder apparatus 102 may be implemented by means of hardware such as electronics circuits, or may be implemented by software, or program sequences, which can be installed in and run on a processor system, e.g. microcomputer including a CPU (Central Processor Unit), which are adapted to implement the functions of some, or the entirety, of those components. That may also be the case with an alternative embodiment which will be described below. In this connection, the word "circuit" may be understood not only as hardware, such as an electronics circuit, but also as a function that may be implemented by software installed and executed on a computer. Furthermore, the data, signal or information of an image, frame, bit plane or the like may sometimes be referred simply to as "image", "frame", "bit plane" or the like even when dealt with in the form of data, signal or information.

In operation, an input sequence 121 to be supplied to the video encoder apparatus 101 may contain key frames and Wyner-Ziv frames, the latter being "non-key frames". The video encoder apparatus 101, which may also be referred to as encoder side, and the video decoder apparatus 102, which may also be referred to as decoder side, execute the encoding and the decoding, respectively. For the illustration purpose only, the operation will be described in relation to the case where the key frames and Wyner-Ziv frames of the input sequence 121 will be encoded alternately in such a fashion that the first and second frames of the input sequence are encoded as a key and a Wyner-Ziv frame, respectively, and likewise, the third and subsequent frames are encoded as key or Wyner-Ziv frame alternately.

First, the operation of the video encoder apparatus 101 will be described. The key frame encoder 104 deals, in encoding, with the first frame in the input sequence 121 as a key frame. The key frame encoder 104 executes intra-frame encoding on the first frame in the manner as conventionally done on a frame coded with JPEG, MPEG or the like, for example, as taught by Anne Aaron, et al., stated in the introductory part of the present specification. The key frame encoder 104 then transmits the encoded data to the key frame decoder 106.

The Wyner-Ziv frame encoder 103 subsequently deals, in encoding, with the second frame of the input sequence 121 as a Wyner-Ziv frame.

Next, with reference to FIGS. 2A and 2B, the operation of the Wyner-Ziv frame encoder 103 will be described. FIGS. 2A and 2B are flow charts for use in describing the operation of the Wyner-Ziv frame encoder 103 in the preferred embodiment. FIGS. 2A and 2B are in succession via a connector "A".

First, as shown in FIG. 2A, the transformer/quantizer 107 is fed with the original image on the second frame, or Wyner-ziv frame, in the input sequence 121 (step S201).

In step S202, the transformer/quantizer 107 transforms the original image of the second frame into a transform coefficient domain by means of the discrete cosine transform (DCT), and quantizes the latter for each band. The transformer/quantizer 107 subsequently digitizes the quantized transform coefficients for each band into a binary form to resolve them down to bit planes.

The transformer/quantizer 107 may carry out the bit-plane resolution for the respective bands by resolving the transform coefficients of the entire length of one frame down to bit planes, or alternatively resolving down to bit planes on the basis of the length corresponding to each of the sub-regions forming that frame, by way of example. In general, an error correction code having its length longer can exhibit a higher error correction capability. So far as motion videos are concerned, however, the amount of errors can be different from sub-region to sub-region of a frame such that more errors appear in a predictive image of a sub-region more moveable than a sub-region less moveable. It is therefore expected that the bit planes are prepared sub-region by sub-region to thereby allow the characteristics of the sub-regions to be more comprehensive.

Then, the side information generator 109 is supplied from the key frame encoder 104 with the key frame image positioned before or behind the Wyner-Ziv frame, i.e. the second frame, or the key frames preceding and following the Wyner-Ziv frame (step S203). More specifically, the side information generator 109 receives from the key frame encoder 104 the key frame image of the first or third frame, or the images of the first and third frames.

The side information generator 109 subsequently forms a predictive image for a Wyner-Ziv frame, namely the second frame (step S204). Such a predictive image can be formed by using a key frame preceding that Wyner-Ziv frame, taking the average between the key frame images before and behind the Wyner-ziv frame, or carrying out a refine search for motion as presented in Catarina Brites, et al., indicated earlier The side information generator 109 then performs the transform/quantization on the formed predictive image, and resolves the resultant data into bit planes (step S205). In this case, the frame may be separated into the bit planes of the same length as the bit planes dealt with by the transformer/quantizer 107.

The transformer/quantizer 107 in turn supplies the bit planes of the original image to the error detector 110 (step S206). At the same time, the side information generator 109 feeds the bit planes of the predictive image of the Wyner-Ziv frame, which is the second one, to the error detector 110.

The error detector 110 compares the supplied bit planes of the original image with the corresponding bit planes of the predictive image to thereby detect the differences, or errors, therebetween (step S207).

When no differences, or errors, are detected between the bit planes of the original image and the predictive image, the error detector 110 delivers the indices identifying these bit planes to the transmission code amount calculator 111 (step S208).

The side information generator 109 then feeds the transform coefficients of the predictive image to the transmission code amount calculator 111 (step S209).

Furthermore, the transform/quantizer 107 supplies the transmission code amount calculator 111 with the transform coefficients of the original image (step S210).

Subsequently, the operation advances via the connector "A", FIGS. 2A and 2B, to step S211. In step S211, the transmission code amount calculator 111 in turn estimates the amount of error correction codes needed for the error correction.

In order to estimate or calculate the amount of the correction codes, the calculation manner described in Catarina Brites, et al., can be employed by way of example. More specifically, the transmission code amount calculator 111 compares the transform coefficients of the received predictive image of the Wyner-Ziv frame with the transform coefficients of the original image to thereby estimate a distribution parameter of an expected error for each band. In the case where the expected error follows a Laplace distribution whose average is zero, the estimation of a distribution parameter may be obtained from calculating the variance of the differences in the transform coefficients between the predictive image and the original image. Then, on the basis of the estimated distribution parameter, the fallibility of the predictive image of each bit plane is estimated, and subsequently the amount of error correction codes required to correct the fallibility is calculated. The predictive image formed by the side information generator 109 on the encoder side is assumed as a predictive image formed on the decoder side, and thereby the fallibility is estimated so as to estimate the amount of error correction codes for error correction and select a thinning pattern.

The transmission code amount calculator 111 then refers to the indices of the bit planes to be processed to determine whether or not errors are detected on these bit planes by the error detector 110 (step S212).

When the error detector 110 does not detect any errors in the bit planes, the transmission code amount calculator 111 supplies the Slepian-Wolf encoder 108 with information 131 on the detection of no errors as the information on the thinning pattern (thinning pattern 0) and the indices identifying the bit planes in question (step S213).

When the error detector 110 detects an error in a bit plane, the transmission code amount calculator 111 supplies the Slepian-Wolf encoder 108 with information 131 on the amount of error correction codes to be transmitted as the information on the thinning pattern along with the indices of the bit planes in question (step S214).

The transformer/quantizer 107 subsequently supplies the Slepian-Wolf encoder 108 with the bit planes of the original image (step S215).

The Slepian-Wolf encoder 108 in turn references the indices of the bit planes to be processed to check on the information on the corresponding thinning pattern, and determines whether or not the checked pattern is the thinning pattern 0 (step S216).

When the information on the thinning pattern exhibits the thinning pattern 0, the Slepian-Wolf encoder 108 transmits only the information about the thinning pattern as the thinning pattern 0 to the Wyner-Ziv frame decoder 105 (step S217).

If the thinning pattern information does not contain the thinning pattern 0, the Slepian-Wolf encoder 108 performs the Slepian-Wolf encoding on the bit planes (step S218).

The Slepian-Wolf encoder 108 then thins out the error correction codes based on the thinning pattern calculated by the transmission code amount calculator 111, and then sends the thinning pattern information and the thinned error correction codes to the Wyner-Ziv frame decoder 105 (step S219).

Steps S216 to S219 are repeatedly carried out on all bit planes (step S220).

Secondly, the operation of the video decoder apparatus 102 will be described. The key frame decoder 106 receives and decodes the encoded key frames 133 from the key frame encoder 104. The key frame decoder 106 executes intra-frame decoding on the first frame of the key frames in the similar way to the conventional decoding as done on one frame with JPEG or MPEG to thereby obtain a decoded image 135.

The Wyner-Ziv frame decoder 105 then decodes the Wyner-Ziv frame, corresponding to the second frame.

Next, with reference to FIG. 3, the operation of the Wyner-Ziv frame decoder 105 will be described. FIG. 3 is a flow chart illustrating on a step-by-step basis the operation of the Wyner-Ziv frame decoder 105 according to the preferred embodiment.

The side information generator 114 receives the first and third key frame images included in the decoding resultant 123 obtained by the key frame decoder 106 (step S301).

The side information generator 114 then forms a predictive image for the Wyner-Ziv frame, or the second frame (step S302). The predictive image can be formed by, for instance, averaging out the preceding and following frames, or using the motion estimation and compensation presented in Joao Ascenso, et al., stated earlier.

The side information generator 114 subsequently transforms and quantizes the formed predictive image, and resolves the latter into binary bit planes (step S303). In the preferred embodiment, the length of each bit plane may be defined to correspond to a predetermined length, such as the entire length of a frame or of a sub-region of the frame, so as to be compatible with that dealt with by the Wyner-Ziv frame encoder 103.

The side information generator 114 then delivers the bit planes of the predictive image in the Wyner-Ziv frame, or the second frame, to the Slepian-Wolf decoder 112 (step S304).

Now, the Slepian-Wolf decoder 112 receives a thinning pattern and error correction codes from the Wyner-Ziv frame encoder 103 (step S305).

The Slepian-Wolf decoder 112 then determines whether or not the obtained thinning pattern corresponds to the thinning pattern 0 (step S306).

When the thinning pattern of the bit planes is not the thinning pattern 0, the Slepian-Wolf decoder 112 uses the received error correction codes for the error correction codes thinned out based on the information on the received thinning pattern to thereby carry out the error correction, i.e. the Slepian-Wolf decoding, on the bit planes of the predictive image supplied from the side information generator 114 (step S307).

Then, the Slepian-Wolf decoder 112 feeds the result of the decoding to the decoded image generator 113 (step S308).

If the thinning pattern corresponds to the thinning pattern 0, then the Slepian-Wolf decoder 112 supplies the bit planes of the predictive image from the side information generator 114 to the decoded image generator 113 without performing the error correction, or Slepian-Wolf decoding (step S309).

Steps S306 to S309 are repeatedly carried out on all bit planes generated by the side information generator 114 (step S310).

The decoded image generator 113 in turn reconstructs into a frame the bit planes of the decoding result or of the predictive image inputted from the Slepian-Wolf decoder 112, and performs the inverse transform and dequantization on the reconstructed frame to thereby obtain decoded image 129 (step S311).

In summary, when no errors are detected in the transform coefficients between an original image based on the Wyner-Ziv frame and a predictive image, the information indicating that no errors are found is sent out instead of the error correction codes for the Wyner-Ziv frame in question. Consequently, in the case where no errors are detected between the predictive image and the original image, there is no need to transmit a large amount of error correction codes, and thereby the processing load on the error correction can be diminished. Moreover, since no error correction codes are sent out when no errors are found between a predictive image and an original image, the efficiency in coding can be improved.

In addition, since the Slepian-Wolf decoder 112 is responsive to information on no errors detected for outputting a predictive image as a decoded image of the key frame in question, there is no need to execute the error correction on the predictive image when no errors are detected between the predictive image and the original image, thereby allowing the processing load on error correction to be reduced and consequently to improve the efficiency in coding.

Furthermore, when no errors are detected between a predictive image and an original image, the Slepian-Wolf encoding and decoding are not carried out. Thus, the throughput of the Slepian-Wolf encoding/decoding can be reduced.

Now, an alternative embodiment of the video transmission system will be described in detail with reference to FIG. 4. As is the case with the above preferred embodiment, there is some possibility that predictive images formed by an encoder and a decoder have any differences, or errors, therebetween. In such a case, if a comparison between a predictive image formed on the encoder side and an original image results in no errors whereas a comparison between the predictive image formed on the decoder side and the original image reveals errors therebetween, then the encoder side determines that no errors are present and thus does not transmit error correction codes, so that the error correction cannot be performed on the predictive image on the decoder side.

In order to solve this problem, the alternative embodiment is adapted to form on the decoder side the same predictive image as formed on the encoder side, and to use, upon a receipt of information on no detection of errors, information on the predictive image thus formed to execute the decoding in the same manner as used on the encoder side.

Figure 4:
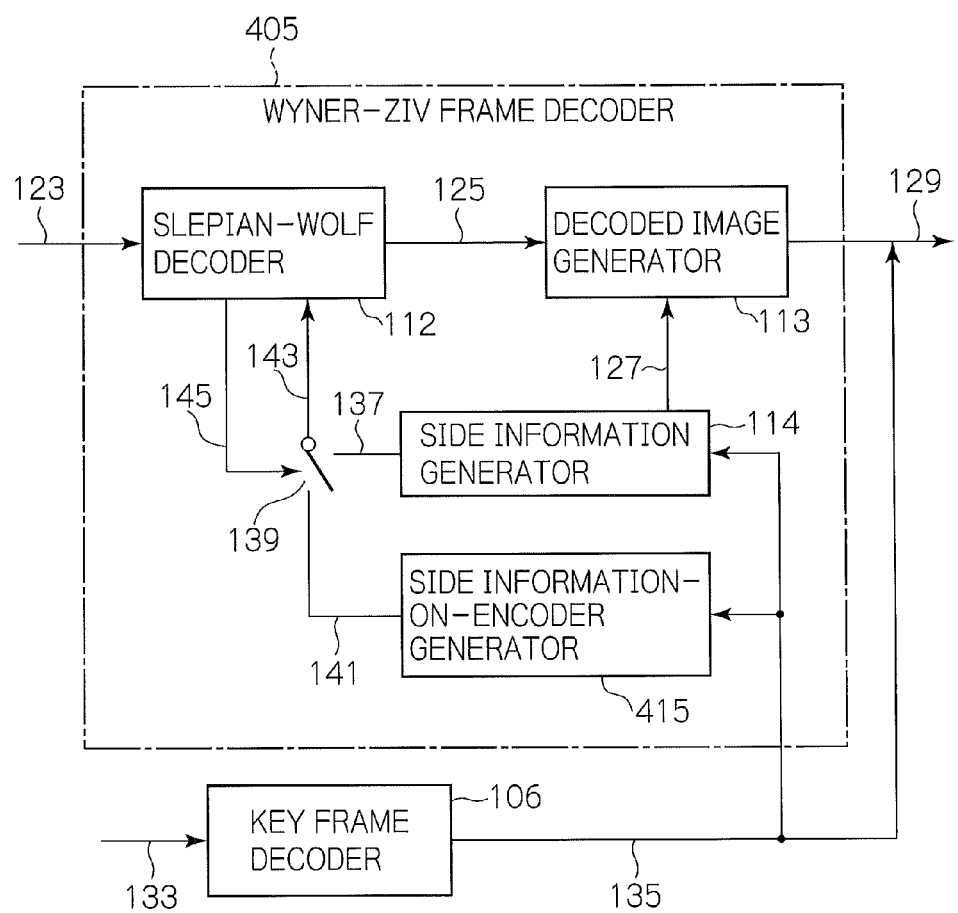
FIG. 4 is a schematic block diagram showing a video decoder apparatus according to an alternative preferred embodiment.

FIG. 4 is a schematic block diagram showing a video decoder apparatus 402 of the alternative embodiment. In the alternative embodiment, the video encoder apparatus 101 shown in and described with reference to FIG. 1 may be interconnected to the decoder apparatus 402. Like constituent elements are designated with the same reference numerals.

As seen generally from FIG. 4, the video decoder apparatus 402 comprises the key frame decoder 106 and a Wyner-Ziv frame decoder 405. The Wyner-Ziv frame decoder 405 comprises a side information-on-encoder generator 415 in addition to the Slepian-Wolf decoder 112, the decoded image generator 113 and the side information generator 114, which are interconnected as illustrated. Thus, the Wyner-Ziv frame decoder 405, a kind of non-key frame decoder, may be the same as the Wyner-Ziv frame decoder 105 in accordance with the illustrative embodiment shown in FIG. 1 except that the side information-on-encoder generator 415 is additionally provided with its associated connections including a switch 139 as depicted.

The side information-on-encoder generator 415 is also a predictive image generator, which is connected to the connection 135 to receive a key frame positioned before or behind a Wyner-Ziv frame, or key frames preceding and following the Wyner-Ziv frame. The side information-on-encoder generator 415 may be adapted to produce a predictive image of the Wyner-Ziv frame in substantially the same manner as the side information generator 109 of the Wyner-Ziv frame encoder 103 producing a predictive image of the Wyner-Ziv frame. The side information-on-encoder generator 415 transforms and quantizes the formed image, and resolves the latter down to bit planes, which will be developed on its output 141 to the switch 139.

The Slepian-Wolf decoder 112 according to the alternative embodiment has its input port 143 interconnected to the switch 139, as shown. The switch 139 is a selector controllable by the Slepian-Wolf decoder 112 as symbolically depicted with a connection 145, and is set to usually connect the output 143 from the Slepian-Wolf decoder 112 to the input 137 to the side information generator 114.

The Slepian-Wolf decoder 112 is adapted to check on error values in the bit planes generated by the side information generator 114 on the basis of information about a thinning pattern fed from the Wyner-Ziv frame encoder 103. When the error values are not zero, the decoder 112 performs the Slepian-Wolf decoding on the bit planes. Otherwise, namely, when the error values are zero, the decoder 112 controls the switch 139 so as to receive corresponding bit planes from the side information-on-encoder generator 415, and define the received bit planes as a decoding result.

In operation, the video decoder apparatus 402, including the key frame decoder 106, according to the alternative embodiment may operate similarly to the video decoder apparatus 102 in the preferred embodiment shown in FIG. 1, except for the operation which will specifically be described below.

Figure 5:
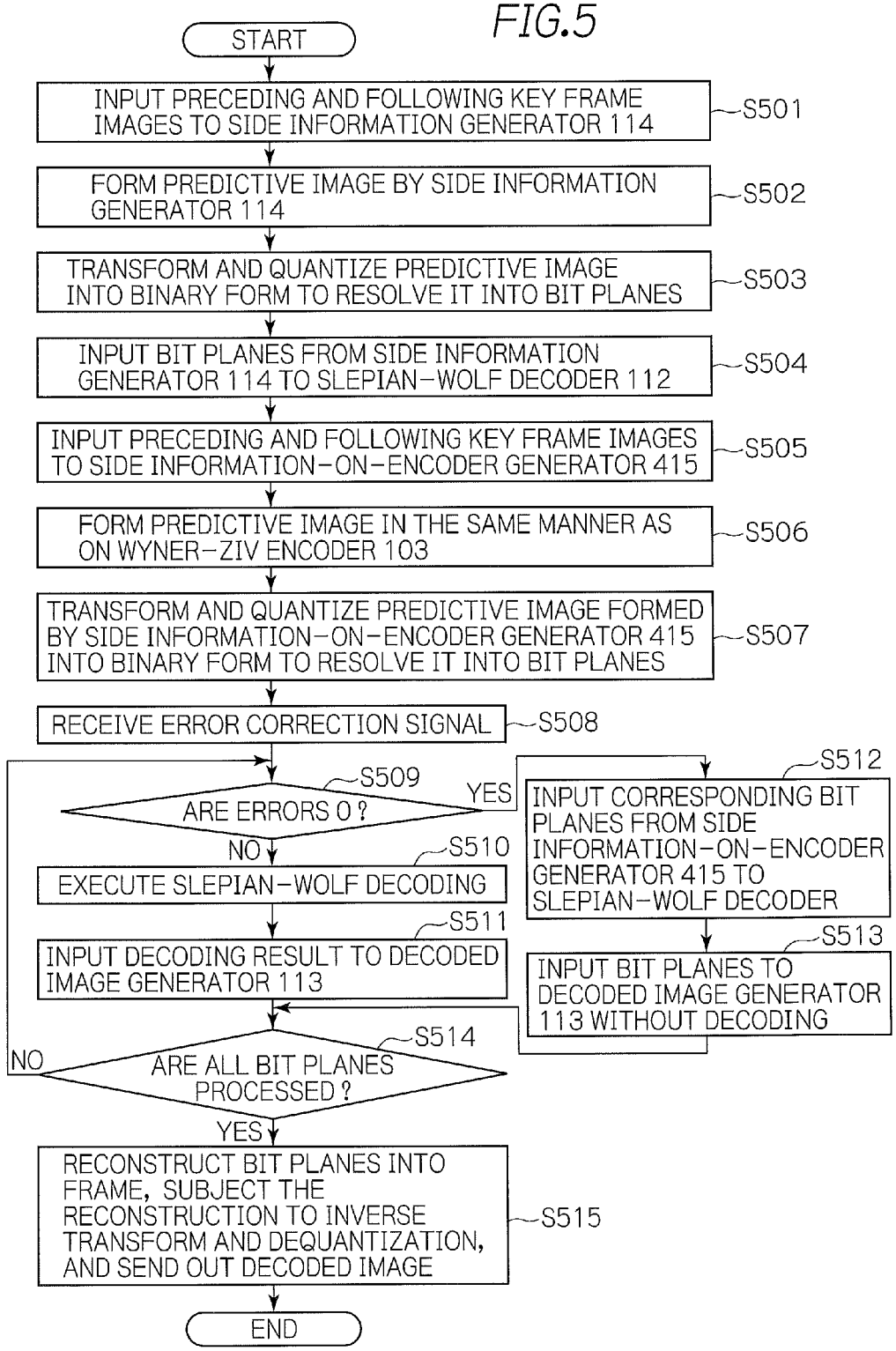
FIG. 5 is a flow chart useful for understanding an operation of the Wyner-Ziv frame decoder according to the alternative embodiment shown in FIG. 4.
Figure 6:
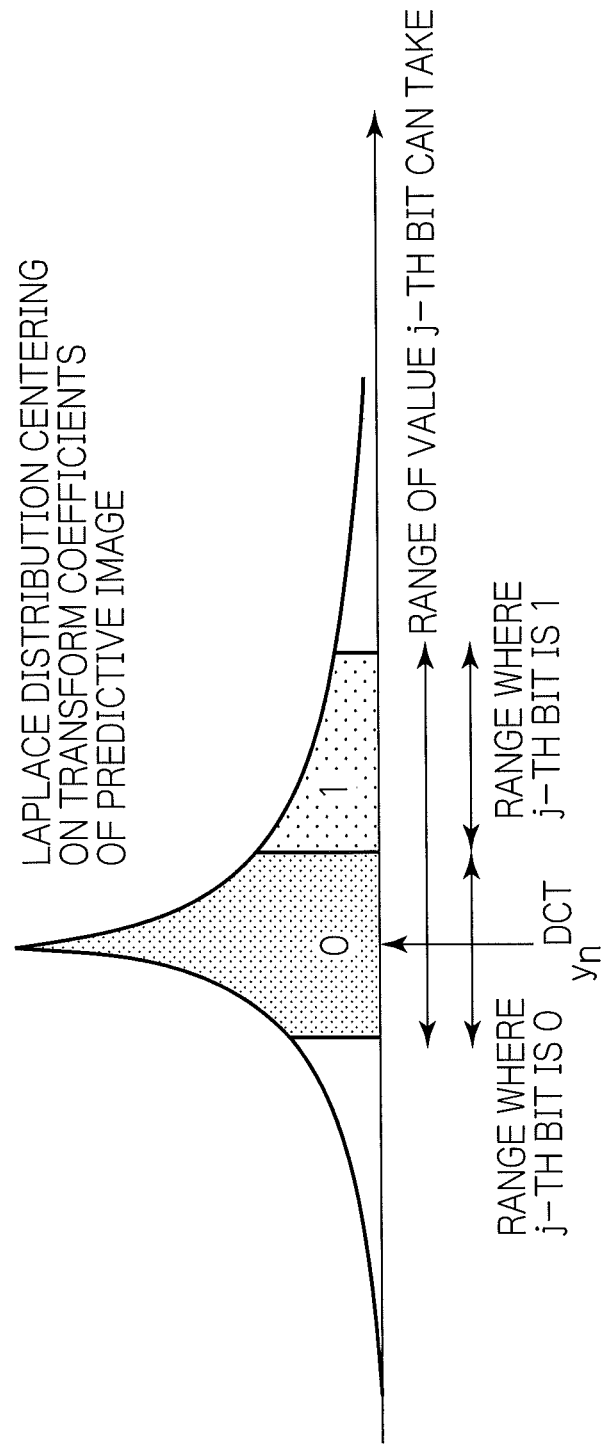
FIG. 6 schematically illustrates how to calculate a conditional probability pn.
Figure 7A:
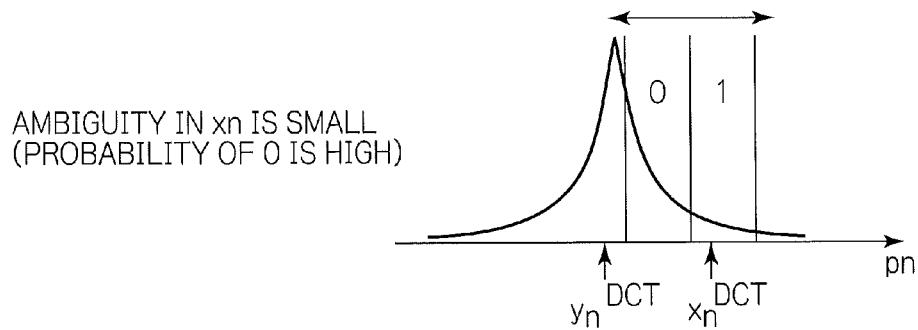
FIGS. 7A, 7B and 7C are graphs plotting the probability pn for use in understanding the drawbacks in a conventional solution.
Figure 7B:
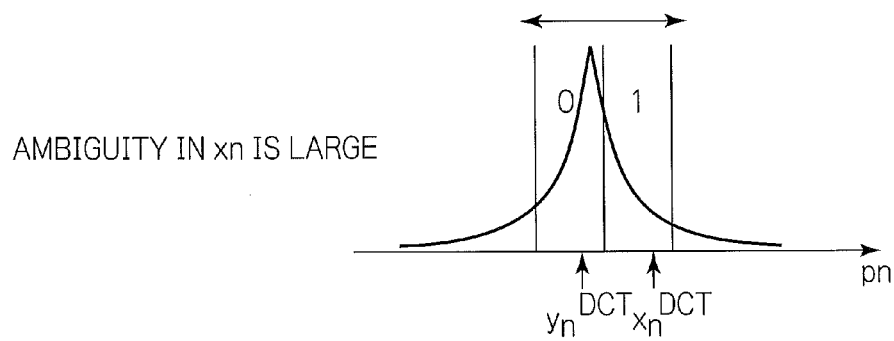
Figure 7C:
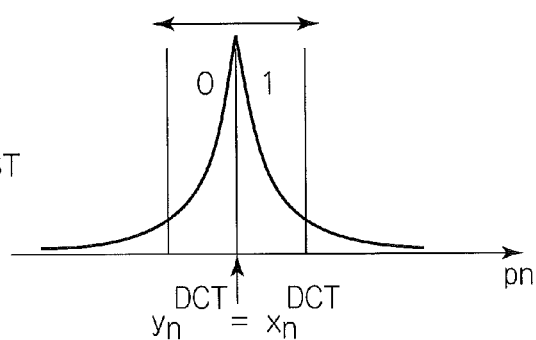

FIG. 5 is a flow chart illustrating the operation of the Wyner-Ziv frame decoder 405 of the alternative embodiment. The side information generator 114 receives images of key frames preceding and following a Wyner-Ziv frame, namely, the first and third frames, and the second frame, respectively, included in a result 135 outputted from the key frame decoder 106 (step S501).

The side information generator 114 then forms a predictive image for the Wyner-Ziv frame, i.e. the second frame (step S502). The predictive image can be formed by, for instance, averaging out the preceding and following frames, or using the motion estimation and compensation presented in Joao Ascenso, et al., as with the embodiment shown in FIG. 1.

The side information generator 114 subsequently performs the transform and quantization on the formed predictive image, and resolves the resultant data into binary bit planes (step S503). The length of each bit plane may be defined to correspond to a predetermined length, such as the entire length of a frame or of a sub-region in the frame, so as to be compatible with the Wyner-Ziv frame encoder 103.

The side information generator 114 then delivers the bit planes of the predictive image in the Wyner-Ziv frame, or the second frame, to the Slepian-Wolf decoder 112 (step S504).

The side information-on-encoder generator 415 receives images of key frames (first and third frames) preceding and following the Wyner-Ziv frame (second frame) included in a result 135 outputted from the key frame decoder 106 (step S505).

The side information-on-encoder generator 415 then forms a predictive image in the same manner of forming a predictive image as with the side information generator 109 of the Wyner-Ziv frame encoder 103 (step S506).

In the alternative embodiment the side information-on-encoder generator 415 is designed in advance such as to produce a predictive image in the same manner as with the side information generator 109. The invention is however not restricted to such a specific manner. By way of example, the side information-on-encoder generator 415 may be adapted to receive information from the Wyner-Ziv frame encoder 103 about how a predictive image is formed and form a predictive image on the basis of the received information.

Now, the side information-on-encoder generator 415 subsequently performs the transform and quantization on the formed predictive image, and resolve the resultant data into binary bit planes (step S507). Also with the generator 415, the length of each bit plane may be defined to be correspondent to a predetermined length, such as the entire length of a frame or of a sub-region in the frame, so as to be compatible with the Wyner-Ziv frame encoder 103.

The Slepian-Wolf decoder 112 receives a thinning pattern together with the error correction codes from the Wyner-Ziv frame encoder 103 over the connection 123 (step S508).

The Slepian-wolf decoder 112 then decides whether or not the received thinning pattern is a thinning pattern 0 (step S509).

When the thinning pattern on bit planes is not the thinning pattern 0, namely, errors are detected, the Slepian-Wolf decoder 112 uses the error correction codes thus received as error correction codes, which have been thinned out with the information on the received thinning pattern, to carry out the error correction, namely the Slepian-Wolf decoding, on the bit planes of the predictive image supplied from the side information generator 114 (step S510).

Then, the Slepian-Wolf decoder 112 feeds the result of the decoding 125 to the decoded image generator 113 (step S511).

If the thinning pattern corresponds to the thinning pattern 0, i.e. no errors are detected, the Slepian-Wolf decoder 112 is supplied from the side information-on-encoder generator 415 with the bit planes of the predictive image formed in the same manner as the encoder side does (step S512).

Then, the Slepian-Wolf decoder 112 refrains from performing the error correction, or Slepian-Wolf decoding, on the bit planes received from the side information-on-encoder generator 415, but supplies the bit planes of the predictive image formed in the same manner as the encoder side does to the decoded image generator 113 (step S513).

Steps S509 to S513 are repeatedly carried out on all bit planes generated by the side information generator 114 (step S514).

The decoded image generator 113 in turn reconstructs into a frame the bit planes of the decoding result inputted from the Slepian-Wolf decoder 112 or of the predictive image formed in the same manner as the encoder side, and performs the inverse transform and dequantization on the reconstructed frame to thereby obtain decoded image 129 (step S515).

In short, the alternative embodiment employs the same manner of forming a predictive image as on the encoder side to thereby form a predictive image of Wyner-Ziv frame, and, when the encoder side outputs information indicating that no errors are detected, the predictive image formed in the same manner as the encoder side is rendered to be a result of the key frame decoding. Thus, the alternative embodiment provide, in addition to the advantages provided by the preferred embodiment shown in FIG. 1, another advantage that, even when any differences are present between predictive images formed by the side information generator 109 in the encoder apparatus 101 and by the side information generator 114 in the decoder apparatus 402, it is not necessary to perform the error correction on the predictive image formed by the side information generator 114 in the decoder apparatus 402. As a consequence, the processing load on the error correction can further be diminished.

The illustrative embodiments described above are configured to transmit information from the encoder side to the decoder side. Such transmission and reception may not be limited to wired or wireless communications, but may be performed by way of recording media.

Furthermore, the above illustrative embodiments are adapted to assign information on no errors found on the bit planes of a predictive and an original image to the thinning pattern 0 as information on thinning pattern. The invention is not limitative to such a specific patterning, but any other manners can be applied as long as information about no detection of errors can be transmitted or transferred to the decoder side.

The side information-on-encoder generator 415 in the alternative embodiment is designed under the condition that it is already known how the Wyner-Ziv frame encoder 103 produces a predictive image. Alternatively, the system may be adapted such that the Wyner-Ziv frame encoder 103 transfers information on the manner of forming a predictive image to the Wyner-Ziv frame decoder 105, which in turn refers to the information thus received to form a predictive image accordingly.

The entire disclosure of Japanese patent application No. 2009-55023 filed on Mar. 9, 2009, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A video encoder apparatus using distributed video coding (DVC) to encode an input sequence including a key frame and a non-key frame with respective encoding schemes different from each other to transmit at least partially an error correction code for an encoded non-key frame to a decoder apparatus, said encoder apparatus comprising:

a key frame encoder for encoding the key frame and transmitting the encoded key frame to the decoder apparatus; and a non-key frame encoder for forming a predictive image of the non-key frame on a basis of the encoded key frame, and determining, based on a fallibility of a transform coefficient of the predictive image with respect to a transform coefficient of an original image of the inputted non-key frame, an amount of error correction codes to be transmitted to transmit the error correction codes associated with the determined amount of error correction codes, said non-key frame encoder transmitting, when no error is detected between the transform coefficients of the original image and the predictive image, information indicating no error detected, instead of the error correction code for the non-key frame.

2. The apparatus in accordance with claim 1, wherein said non-key frame encoder comprises:

a transformer/quantizer for transforming the original image of the inputted non-key frame to a transform coefficient domain, and quantizing the transform coefficient for each band to resolve the transform coefficient into bit planes;

a predictive image generator for forming the predictive image of the non-key frame on the basis of the key frame encoded by said key frame encoder, transforming the predictive image to the transform coefficient domain, and quantizing the obtained transform coefficient for each band to resolve the transform coefficient into the bit planes;

a transmission code amount calculator for using the transform coefficient of the original image formed by said transformer/quantizer and the transform coefficient of the predictive image formed by said predictive image generator to calculate the amount of error correction codes to be transmitted which are needed for error correction for the bit planes of the predictive image;

a transmitter encoder for encoding the bit planes of the original image formed by said transformer/quantizer, and transmitting to the decoder apparatus the error correction codes in the amount calculated by said transmission code amount calculator; and an error detector for detecting errors between the bit planes of the original image formed by said transformer/quantizer and of the predictive image formed by said predictive image generator, said transmitter encoder transmitting information indicating that no error is detected, instead of the error correction code, with respect to one of the bit planes of the original image in which no error is detected by said error detector.

3. The apparatus in accordance with claim 2, wherein said transmitter encoder does not encode the bit planes of the original image, in which no error is detected by said error detector.

4. The apparatus in accordance with claim 2, wherein said transmission code amount calculator estimates, under a condition that a variance of a difference in the transform coefficients between the predictive image and the original image conforms to a Laplace distribution, the fallibility of the predictive image with respect to the original image to determine the amount of the error correction code needed for the error correction of the bit planes of the predictive image.

5. A video decoder apparatus using distributed video coding (DVC), wherein an encoded key frame and at least partially an error correction code are acquired from an encoder apparatus, the error correction code being in an amount corresponding to a fallibility of a transform coefficient of a predictive image with respect to a transform coefficient of an original image of a non-key frame, and a decoded key frame is used to form a predictive image of the non-key frame to perform an error correction on the predictive image with the error correction code, said decoder apparatus comprising a non-key frame decoder for forming the predictive image of the non-key frame in a manner in which the predictive image is formed on the encoder apparatus, said non-key frame decoder being operative in response to information, which indicates that no error is detected and is acquired instead of the error correction code for the non-key frame, to output the predictive image thus formed as a decoded image of the key frame.

6. The apparatus in accordance with claim 5, further comprising a key frame decoder for decoding the encoded key frame to thereby derive the decoded image, said non-key frame decoder comprising:

a first predictive image generator for forming the predictive image of the non-key frame on the basis of the decoded image of the key frame decoded by said key frame decoder, transforming the predictive image to a transform coefficient, and quantizing the transform coefficient for each band to resolve the transform coefficient into bit planes;

a second predictive image generator for using the decoded image of the key frame decoded by said key frame decoder to form the predictive image of the non-key frame in the manner in which the predictive image is formed on the encoder apparatus, transforming the predictive image to the transform coefficient, and quantizing the transform coefficient for each band to resolve the transform coefficient into bit planes;

a decoder responsive to the error correction code for the non-key frame for using the acquired error correction code to perform the error correction on the bit planes of the predictive image formed by said first predictive image generator, said decoder being responsive to information on a detection of no error, which is acquired instead of the error correction code for the non-key frame, to refrain from the error correction to supply the bit planes of the predictive image formed by said second predictive image generator to said decoded image generator; and a decoded image generator for reconstructing the bit planes fed from said decoder into a frame, and carrying out inverse transform and dequantization on the reconstructed frame to obtain the decoded image.

7. A video transmission system comprising:

a video encoder apparatus using distributed video coding (DVC) to encode an input sequence including a key frame and a non-key frame with respective encoding schemes different from each other to transmit at least partially an error correction code for an encoded non-key frame to a decoder, said encoder apparatus comprising:

a key frame encoder for encoding the key frame and transmitting the encoded key frame to the decoder; and a non-key frame encoder for forming a predictive image of the non-key frame on a basis of the encoded key frame, and determining, based on a fallibility of a transform coefficient of the predictive image with respect to a transform coefficient of an original image of the inputted non-key frame, an amount of error correction codes to be transmitted to transmit the error correction codes associated with the determined amount of error correction codes, said non-key frame encoder transmitting, when no error is detected between the transform coefficients of the original image and the predictive image, information indicating no error detected, instead of the error correction code for the non-key frame, said system further comprising a video decoder apparatus using the DVC, wherein the encoded key frame and at least partially the error correction code are received from said encoder apparatus, the error correction code being in an amount corresponding to the fallibility of the transform coefficient of the predictive image with respect to the transform coefficient of the original image of the non-key frame, and a decoded key frame is used to form the predictive image of the non-key frame to perform the error correction on the predictive image with the error correction code, said decoder apparatus comprising a non-key frame decoder for forming the predictive image of the non-key frame in a manner in which the predictive image is formed on said encoder apparatus, said non-key frame decoder being operative in response to information, which indicates that no error is detected and is received instead of the error correction code for the non-key frame, to output the predictive image thus formed as a decoded image of the key frame.

* * * * *

UNITED STATES PATENT AND TRADEMARK OFFICE
CERTIFICATE OF CORRECTION

| | | |
|---|---|---|
| PATENT NO. | : 9,071,826 B2 | Page 1 of 1 |
| APPLICATION NO. | : 13/725966 | |
| DATED | : June 30, 2015 | |
| INVENTOR(S) | : Takahiro Yamasaki | |

It is certified that error appears in the above-identified patent and that said Letters Patent is hereby corrected as shown below:

On the Title Page, Item 62

"Division of application No. 12/656,812, filed on Feb. 19, 2010, now Pat. No. 8,363,733." should be changed to --Division of application No. 12/656,912, filed on Feb. 19, 2010, now Pat. No. 8,363,733.--

Signed and Sealed this
Fifteenth Day of December, 2015

Michelle K. Lee
*Director of the United States Patent and Trademark Office*